(12) United States Patent
Holler et al.

(10) Patent No.: US 6,899,209 B2
(45) Date of Patent: May 31, 2005

(54) STARTER UNIT AND METHOD FOR MATCHING STARTER UNITS IN DRIVE SYSTEMS TO DIFFERENT LIMITING CONDITIONS, IN PARTICULAR DIFFERENT DRIVE ENGINES

(75) Inventors: Heinz Holler, Crailsheim (DE);
Reinhard Kernchen, Satteldorf (DE);
Achim Menne, Crailsheim (DE);
Werner Klement, Heidenheim (DE)

(73) Assignee: Voith Turbo GmbH & Co., KG, Heidenhei (DE)

( * ) Notice: Subject to any disclaimer, the term of this patent is extended or adjusted under 35 U.S.C. 154(b) by 0 days.

(21) Appl. No.: 10/363,504

(22) PCT Filed: Jul. 14, 2001

(86) PCT No.: PCT/EP01/08149
§ 371 (c)(1),
(2), (4) Date: Apr. 11, 2003

(87) PCT Pub. No.: WO02/18817
PCT Pub. Date: Mar. 7, 2002

(65) Prior Publication Data
US 2003/0168298 A1 Sep. 11, 2003

(30) Foreign Application Priority Data

| Aug. 31, 2000 | (DE) | 100 43 146 |
| Mar. 2, 2001 | (DE) | 101 10 077 |
| Mar. 21, 2001 | (EP) | 01106408 |

(51) Int. Cl.[7] .............................................. F16H 45/02
(52) U.S. Cl. ............................ 192/3.29; 192/3.3
(58) Field of Search ......................... 192/3.28, 3.29, 192/3.3, 3.33, 57

(56) References Cited

U.S. PATENT DOCUMENTS

| 2,130,895 A | 9/1938 | Ness .......................... 192/48 |
| 2,731,119 A | 1/1956 | Burdett et al. ............... 192/3.2 |
| 2,777,550 A | 1/1957 | Forster |
| 2,992,713 A | 7/1961 | Stump et al. |
| 3,252,352 A | 5/1966 | General et al. ............... 74/645 |
| 3,476,219 A | 11/1969 | Lauer ........................... 188/90 |
| 5,190,130 A | 3/1993 | Thomas et al. ........... 192/0.032 |
| 5,215,173 A | * 6/1993 | Gimmler ..................... 192/3.3 |
| 5,697,866 A | 12/1997 | Okahara ..................... 477/169 |
| 5,771,998 A | 6/1998 | Olsen et al. ............... 192/3.29 |
| 5,813,505 A | 9/1998 | Olsen et al. ............... 192/3.28 |
| 5,853,350 A | 12/1998 | Hasegawa et al. .......... 477/166 |
| 6,012,558 A | 1/2000 | Kundermann ............. 192/3.29 |
| 6,016,894 A | * 1/2000 | Kundermann .............. 192/3.3 |
| 6,085,879 A | 7/2000 | Ebinger et al. .............. 192/3.3 |

FOREIGN PATENT DOCUMENTS

| DE | 15 50 957 | 7/1969 |
| DE | 29 19 849 | 12/1979 |
| DE | 198 04 635 | 8/1999 |
| DE | 199 06 888 | 8/2000 |
| EP | 0 450 405 | 10/1991 |
| JP | 01-208238 | 8/1989 |
| JP | 08-159274 | 6/1996 |
| JP | 2000-193083 | 7/2000 |
| JP | 2000-266160 | 9/2000 |
| WO | WO 00/55020 | 9/2000 |

* cited by examiner

Primary Examiner—Richard M. Lorence
(74) Attorney, Agent, or Firm—Baker & Daniels

(57) ABSTRACT

The invention relates to a starter unit (1) comprising an input (E) which may be coupled to a drive input, an output (A) which may he coupled to a drive output, a starter element (2) in the form of a hydrodynamic coupling (3), a switchable clutch (7), comprising at least two clutch elements, which may be brought into frictional engagement, either directly or indirectly, by means of further transfer agents, being a first clutch element (10) and a second clutch element (11) each rotationally fixed to the input (E) and the output (A) respectively. The hydrodynamic coupling (3) and the switchable clutch (7) are arranged in a parallel fashion in two power branches (8,9) and may be activated individually or in common.

21 Claims, 9 Drawing Sheets

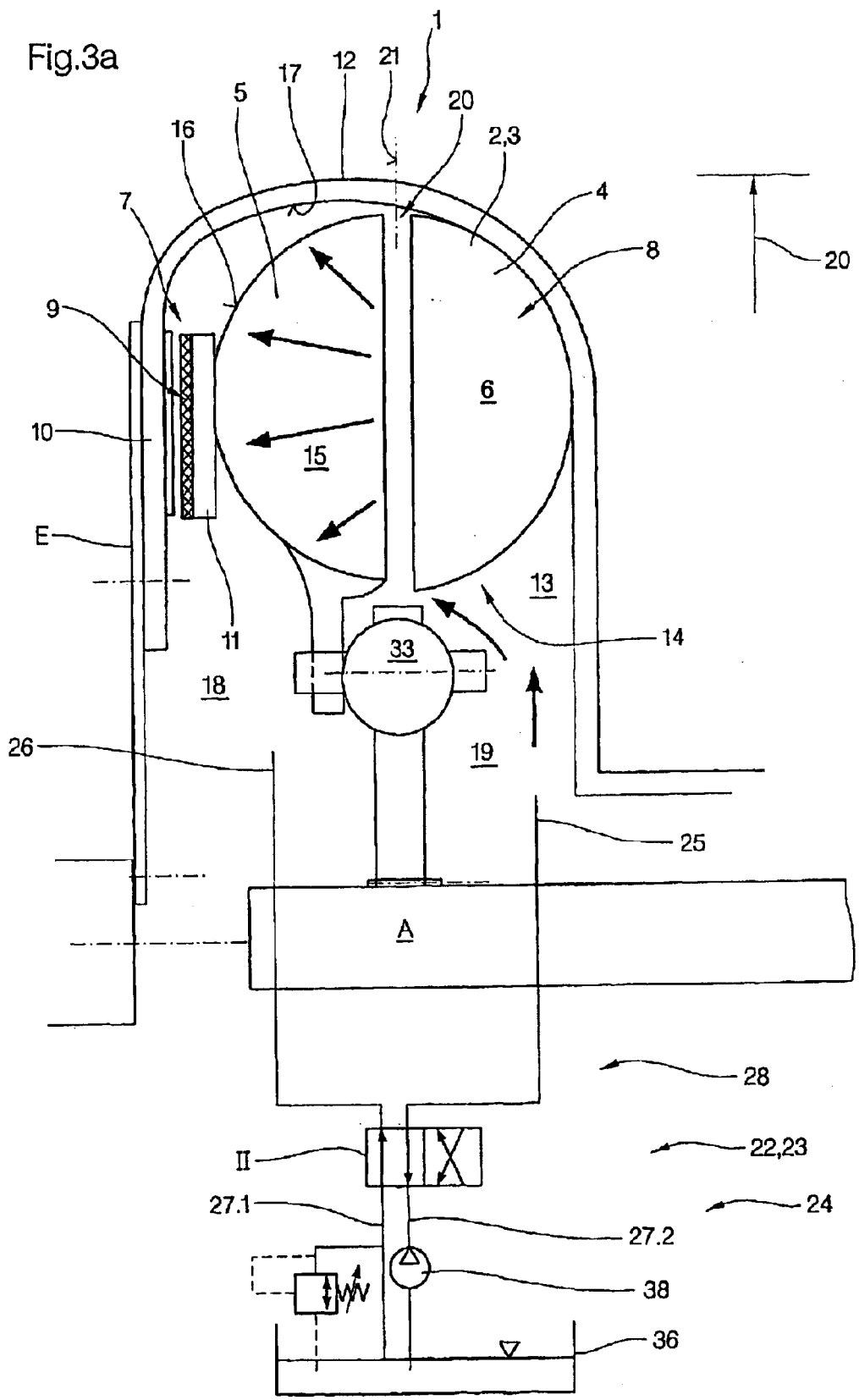

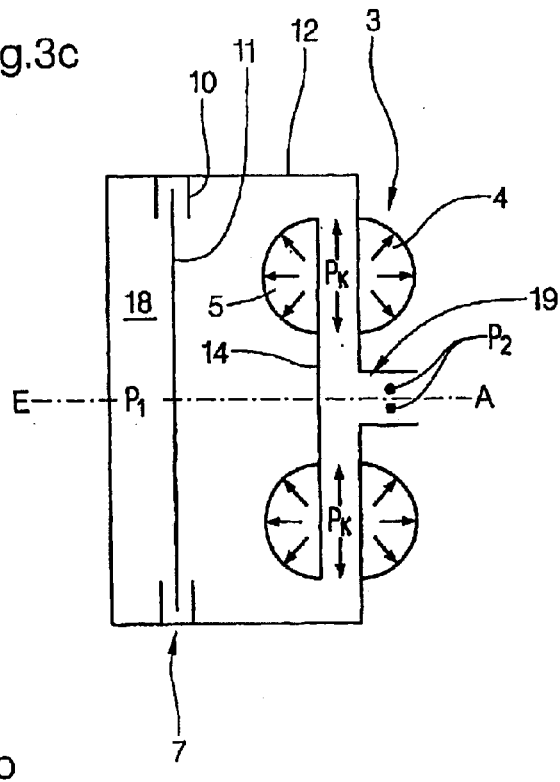
Fig.3c
Fig.4b
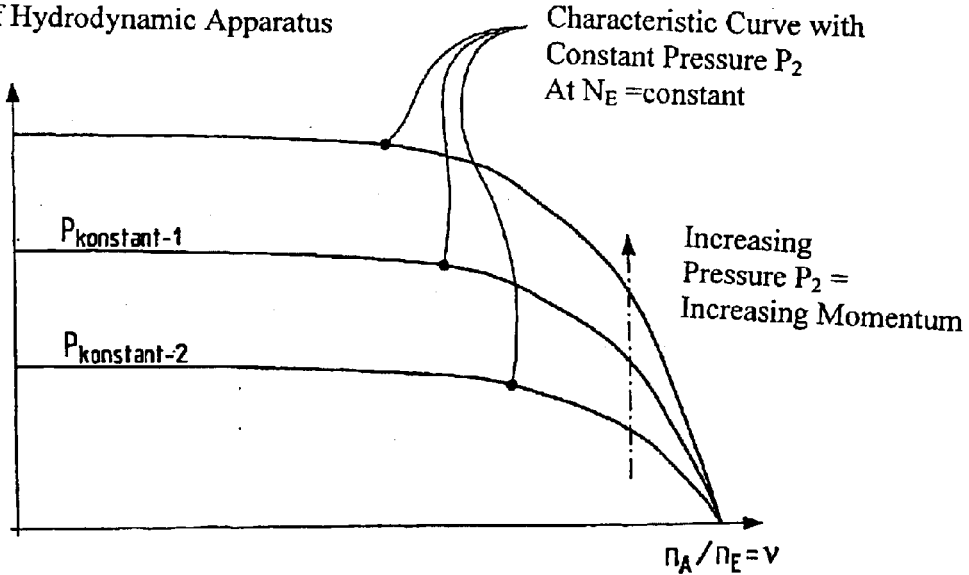

STARTER UNIT AND METHOD FOR MATCHING STARTER UNITS IN DRIVE SYSTEMS TO DIFFERENT LIMITING CONDITIONS, IN PARTICULAR DIFFERENT DRIVE ENGINES

BACKGROUND OF THE INVENTION

The invention relates to a starter unit, and a method for matching starter units in drive systems to different limiting conditions, in particular different drive engines.

Starter units for use in manual transmissions, automatic transmissions and automated gears are known. As a rule, these encompass a hydrodynamic design element in the form of a hydrodynamic revolution/torque converter or a hydrodynamic coupling. DE 198 04 635 A1 relates to a feasible execution of a starter unit for use in gears with a hydrodynamic coupling. This document discloses an execution of a starter unit with a short axial design length, encompassing a pump wheel and a turbine wheel that together form a toroidal working chamber, whereby the pump wheel is arranged on the motor drive side, i.e. the turbine wheel is spatially arranged between the input of the starter unit and the pump wheel. For this purpose, the pump wheel is connected in a rotationally fixed manner with the input and with a rotationally fixed drive coupled with the input via an element, which simultaneously forms the pump wheel shell. There is a bridge coupling placed parallel to the hydrodynamic coupling. This enables power transfer from the input of the starter unit to the output through circumvention of the hydrodynamic design element. The bridge coupling is thereby arranged as a separate design element next to the unit out from the pump wheel and turbine wheel. Furthermore, the starter unit encompasses a device for attenuation of oscillations, which is placed in a diameter area which is arranged above the extreme radial measurement of the toroidal working chamber of the hydrodynamic coupling and is a component of the bridge coupling and forms a coupling element. In other words, the device oscillation attenuation is essentially on the area of a plane or slightly set against the hydrodynamic coupling. This solution has relatively short build but does not, however, fulfill the requirements of certain prescribed installation situations with respect to the required axial design length. Furthermore, this execution is characterized by a high number of design components and enormous assembly effort due to the high number of functional elements. The size of the starter unit is also determined by the required layout of the unit in combination with a drive engine and the subordinated gear levels used in drive systems. In particular, a change in the drive engine requires a change in the layout of the starter unit.

The invention is therefore intended for the task of further developing a starter unit of the type mentioned above, encompassing a hydrodynamic coupling, that may be reversed in parallel manner, as well as in its individual elements in such a way that these elements can be used universally for a majority of drive belts with different limiting conditions, e.g. drive engines of differing power, without changing the design layout. In addition, the starter unit should be characterized by a very small design space requirement in an axial direction, a small number of design parts and the combination of function elements. The design effort must be kept small.

SUMMARY OF THE INVENTION

The solution described in the invention is characterized by a hydrodynamic coupling and a clutch arranged parallel in two power branches which may be switched jointly or individually wherein the hydrodynamic coupling may be controlled or regulated with an operating resources system that includes a supply source, a first connection for coupling with the first guiding channel or chamber, a second connection for coupling with the second guiding channel or chamber, means to change the flow direction through allocation of the inflow or outflow function to both operating resources, supply channels or chambers, and means to control the absolute pressure in the working chamber of the coupling and a differential pressure between the first connection and the second connection.

A starter unit with an input coupled with a drive and an output coupled with a drive encompasses a starter element in the form of a hydrodynamic coupling and a switchable clutch, encompassing at least two clutch elements—a first clutch element and a second clutch element—that may be brought together in an effective striking relationship directly or indirectly via other transfer means, which are each coupled with the input and output in a rotationally fixed manner. According to the invention, a hydrodynamic coupling and a switchable clutch are arranged in parallel and jointly or each switchable on its own. A parallel arrangement means that they are arranged in two different power branches between drive and drive.

The solution described in the invention makes it possible, if necessary, to divide the transferable power into two power branches and bring them back together at the output. The possible transfer either via only one branch or via both branches offers the advantage that the starter unit can be achieved with the individual design elements without changing the layout in different drive systems for use and will be optimally adaptable to the limiting conditions of the type of use in question. Because according to a particularly advantageous further development, the individual power portions are free, i.e. may be controlled independent of each other, there is also the possibility of creating different starting characteristics.

With respect to the power transfer, the following three basic function conditions can be described by the switchability:

- a first basic function condition that is characterized by the sole power transfer via the hydrodynamic coupling, i.e. via the first power branch,
- a second basic function condition that is characterized by the sole power transfer via the switchable clutch, i.e. via the second power branch,
- a third basic function condition that is characterized by the joint power transfer via the hydrodynamic coupling and the switchable clutch and thereby both power branches.

In the second basic function condition, the switchable clutch functions as a bridge coupling. In the third basic function condition, both couplings are in operation. The power uptake of the hydrodynamic coupling is controlled by the degree of filling, whereas the power uptake of the switchable clutch may be set by the contact pressure. Both couplings may be controlled separately, i.e. independently of each other.

In the first basic function condition, the hydrodynamic coupling is switched. In this condition, the power located at the input E is transferred only by the hydrodynamic coupling. The switchable clutch is deactivated. In addition, however, there is the possibility of influencing the transfer relationship of the hydrodynamic coupling. This occurs by changing the degree of filling. Here, an increasing degree of filling causes higher pressure at a constant rotation rate $p_k$ in the working chamber of the hydrodynamic coupling as well as the opposite. In the second basic function condition, the switchable clutch is switched. In this condition, the power at the input E is transferred only via this clutch. The hydrodynamic coupling is deactivated. In addition, when there are specific design requirements, there may also be the possibility of influencing the transfer relationship of the switchable clutch. This occurs by changing the contact pressure so the clutch is operated with slippage.

In the third basic condition both power branches are activated, i.e. a first power portion is transferred via the hydrodynamic coupling and a second power portion is conducted via the switchable clutch. In addition, the individual power portions can be controlled independently of each other. The third basic condition can last from a short-time joint activation until activation via a main portion of the starter area.

The decisive advantage of this solution, in particular the power division and free controllability of the power portions that may be transferred via the individual components is that adaptation to different limiting conditions can be made only in a technical control manner, e.g. without having to make design changes. In addition, this ability to control makes it possible to freely set various starter characteristics. This ability to freely make settings is achieved, for example, via algorithms that are provided or may be provided via a control.

Then the power division can occur via:
a) a setting device equipped to each transfer element—hydrodynamic coupling and switchable clutch—that the can be controlled separately, e.g. in the form of an operating resources or control resources setting system with the corresponding influencing means, e.g. valves or
b) a setting device equipped to each transfer element that the can be controlled separately for striking the individual transfer element with the corresponding contract pressure or a specific filling degree from jointly usable operating resources and/or control means supply or
c) a joint setting that is equipped to jointly usable operating resources or control means supply system.

According to an especially advantageous that is short in an axial direction, the ability to switch and set the transferable power portions occurs via a jointly usable pressure control system, which uses a joint operating resources and/or control means supply. A design requirement for an especially compact starter unit is the formation of the hydrodynamic coupling with a pump wheel shell that is coupled with the pump wheel in a rotationally fixed manner, which surrounds the turbine wheel in an axial direction by direct formation of a first guiding channel or chamber. In addition, there is a second guiding channel or, if a buffer wall is present, by formation of the first guiding channel or chamber between the pump wheel shell and the buffer wall, which leads into the area of the internal diameter of the toroidal working chamber or below it. The first and second guiding channel or chamber may be alternately an inflow or outflow channel or chamber to the toroidal working chamber. Through this alternate change in the function of the individual guiding channel or chamber, the flow direction of the hydrodynamic coupling can easily be changed between centripetal and centrifugal. To conduct the operating resources for centripetal flow, i.e. to achieve flow of the hydrodynamic coupling via the first guiding channel or chamber to the extreme radial area of the toroidal working chamber in the area of the separation plane between the pump and turbine wheel and from this into the work cycle forming in the toroidal working chamber, it is necessary to arrange the pump wheel and turbine wheel in a manner to form a gap between them in such a way that the entry angle that is then formed always causes inflow into the meridian flow of the work cycle and does not divert flow. For this purpose, the pump wheel and the turbine wheel are arranged in a radial direction, preferably with an offset.

To achieve a safer functioning manner, both guiding channels or chambers are insulated from one another.

The operating resources supply or conducting system equipped to the hydrodynamic coupling encompasses an operating resources supply source or a supply and a first connection for coupling with the first guiding channel of chamber as well as a second connection for coupling with the second guiding channel or chamber. According to the invention, there are means for alternate change in the flow direction of the hydrodynamic coupling through assignment of the function of inflow or outflow to both guiding channels or chambers. The concept of connection is to be understood not only as a design element but is viewed as a functional element with respect to its function. This means the formation or realization of the transition between the guiding channels or chambers of the hydrodynamic coupling and the connecting lines—feed line and return line, etc.—to the operating resources source. Individual elements of the operating resources supply system may or may not also be a component of the hydrodynamic coupling. This applies in particular to the means for alternate change in flow direction of the hydrodynamic coupling through assignment of the function of the inflow or outflow to both of the operating resources supply channels or chambers and/or portions of the connecting lines between the operating resources supply source and the guiding channels or chambers. The flow direction of a hydrodynamic coupling can easily be changed without additional design medications with this operating resources supply system for a hydrodynamic coupling.

With reference to the form of the operating resources supply system, there are several possibilities. The concrete execution occurs according to the requirements for the intended use and is left to the judgment of the individual technician.

In a particularly simple formation, the means encompass a valve apparatus with at least two switch settings. The first switch setting is characterized by the coupling between the inflow, i.e. the feed line, and the first guiding channel or chamber and the outflow, i.e. return line, and the second guiding channel or chamber and the second switch setting by the coupling between the inflow and the second guiding channel or chamber and the outflow and the first guiding channel or chamber. Both guiding channels or chambers are preferably coupled via an open cycle with one another. The open cycle contains the operating resources supply source, which also functions as an operating resources storage, and a coupling of this source via the feed and return lines with the guiding channels or chambers in the hydrodynamic coupling. The valve apparatus is only switched between. With this configuration, a cool cycle between exiting from the working chamber and entry via the operating resources storage can be maintained even during constant operation of the transfer elements, in particular the hydrodynamic coupling.

To change the power uptake of the hydrodynamic coupling, the filling degree may be changed in another version of the invention. To additionally control or regulate the desired power of the hydrodynamic coupling to be taken up, the filling degree may be controlled or regulated. This ability to control or regulate can be realized in different ways. In the simplest case, this occurs by providing a corresponding valve apparatus in the inflow or feed line and/or return line. This ability to make settings makes it possible, with respect to various criteria, for example, energy consumption and harmful emissions, to control optimized operation points in the operation area of the drive engine without having to change the design formation and layout of the coupling.

According to one further advantageous development, it is possible to couple the individual guiding channels or chambers with one another via an open cycle and provide each guiding channel or chamber with a controllable valve apparatus that can be coupled with one another via a connecting line whereby the flow direction and the transferable performance in the hydrodynamic coupling can be determined by setting the pressure values, as well as the flow direction and the transferable power, that need to be set in the guiding channels or chambers. The connection to the operating resources source or storage occurs via corresponding lines between a connecting line and an operating resources storage.

The switchable clutch encompasses at least a first coupling element in the form of a first thrust plate and a second coupling element in the form of a second thrust plate that may be brought into a working connection with each other at least indirectly, i.e. either directly or indirectly into contact with one another via other thrust plates. This process will include integration of components of the switchable clutch in the hydrodynamic design element. This will be realized by connecting a coupling element, as a rule a first thrust plate rotationally fixed with the input, in particular the primary wheel shell, while the second thrust plate is connected in a rotationally fixed manner with the output, preferably directly with the turbine wheel. Another possibility, in particular with an uneven number of striking surfaces, exists by providing a buffer wall arranged in a rotationally fixed manner with the turbine wheel, forming a piston, but is moveable in an axial direction The thrust plates are equipped with means to generate contact pressure and thereby generate at least one indirect striking connection between the first thrust plate and the second thrust plate. This solution makes it possible to form a starter unit with very small design space needs in an axial direction through integration of the individual elements of the starter unit in the form of the hydrodynamic coupling, because the existing design elements have already been entrusted simultaneously with the takeover of the function of the other elements.

The means for generating contact pressure encompasses at least one piston element that can be struck with pressure. This element can be equipped separately on the thrust plates. In a particularly compact and therefore advantageous formation, however, the turbine wheel, or buffer wall connected in a rotationally fixed manner with it, but which may be moved in an axial direction is used as a piston element. The pressure chamber for striking the piston element is formed from the part of the toroidal working chamber enclosed by the turbine wheel. With respect to the design execution for takeover of an element function and, furthermore, of an element of the means for generating contact pressure, there are essentially the following possibilities:

1. rotationally fixed coupling of the turbine wheel with the output of the starter unit; however, with the ability to move the turbine wheel along the axel;
2. rotationally fixed connection of the turbine wheel with the output of the starter unit and elastic execution of the coupling between turbine wheel and exit in an axial direction.

In the first case, the striking connection between the first thrust plate and the second, rotationally fixed thrust plate connected with the turbine wheel is achieved via movement of the turbine wheel, whereas in the second case only one reversible formation of the connection between the turbine wheel and the exit of the starter unit makes pressing possible. The axial moveability of the turbine wheel occurs in a range of 0.1 to 2 mm.

In order to realize almost automatic bridging and, moreover, a safe operating manner upon power transfer via the hydrodynamic coupling, a counteracting force is required for axial moveability of the turbine wheel, which fixes the turbine wheel in its position opposite the pump blade wheel. This counteracting force is generated in the invention by a operating resource that is added to the working chamber, which is conducted along the periphery of the turbine wheel between the individual thrust plates of the bridge coupling in the areas of the separation plane between the pump wheel and the turbine wheel in the area of the external diameter of the toroidal working chamber and from there brought into the pump wheel and flows centripetal through the hydrodynamic coupling. Normally, both thrust plates of the switchable clutch lie close to one another. The remaining gap in the $10^{th}$ mm range serves as a throttle site for the flowing operating resources. A pressure difference between the piston surfaces is set by this throttle site, resulting in the required contact pressure for opening and closing the bridge. In the simplest case of execution with a rotationally fixed connection and axial moveability, this can be realized through the bias of the turbine wheel, for example, by means of at least one spring mechanism, which fixes the turbine wheel, and thereby the thrust plate connected with this spring mechanism at a minimum distance of approximately 1 or several 10ths from the first thrust plate or other plate elements arranged in its position. As an analogy, this is also possible for the elastic connection of the turbine wheel to the output occurring in an axial direction. Upon switching from hydrodynamic operation to mechanical drive, only the direction of the operating resources supply is changed, i.e. the flow occurs centrifugal but no longer around the periphery of the turbine wheel. The power equalizer of the buffer wall between the plates connected by the operating resources at or with the turbine wheel and functioning as a piston and forces working in the toroidal working chamber is displaced. The operating resources will now be added to the toroidal working chamber in the area of the internal periphery and the contact pressure generated by the operating resources on the turbine wheel causes a movement in the direction away from the pump wheel, whereby the thrust plate connected in a rotationally fixed manner to the turbine wheel is brought into an effective connection in a striking position with the thrust plate coupled with the pump wheel shell. In a pure coupling operating of the switchable clutch, the clutch would transfer the total power. upon slip operation, the transfer of the other power portion occurs via the hydrodynamic coupling.

With respect to the spatial and design connection of the first and second thrust plates to the turbine wheel or the buffer wall and the pump wheel shell, there are a number of possibilities. The spatial arrangement occurs in an axial direction viewed next to the toroidal working chamber and behind it. The arrangement in radial direction is characterized by internal and external measurements, which preferably will be in the area between the external and internal diameter of the toroidal working chamber. Preferably, the striking surfaces, which are formed by the thrust plates, are aligned parallel to the separation plane between the pump wheel and the turbine wheel so that the required contact pressure is kept to a minimum; technical completion tolerances may be balanced out without difficulty.

Preferably, the rotationally fixed coupling upon connection occurs directly from the turbine wheel on the backside of the part of the turbine wheel that forms the torus. The rotationally fixed connection of the individual thrust plates with the turbine wheel and the pump wheel or the pump wheel shell can also be realized in various ways. The following are conceivable:

a) the one-part execution of thrust plate and turbine wheel and/or thrust plate and pump wheel shell;
b) formation of the individual thrust plates as separate design elements and rotationally fixed coupling via corresponding connection elements with the pump wheel and/or the turbine wheel.

In both cases, the striking surfaces can be formed directly from the thrust plate, i.e. in the first case from the external side of the turbine wheel and an interior surface of the pump wheel shell and in the second case from the separate design elements comprise a striking layer added to the exterior periphery of the turbine wheel or the individual thrust plates.

Under another especially advantageous version of the invention, the starter unit encompasses a device for attenuating oscillations, in particular a torsion oscillation attenuator. With regard to the effectiveness in the individual power transfer areas, the attenuator can be arranged differently. It is conceivable that the torsion attenuator (TSD) can be equipped to:

a) a power branch or
b) both power branches—the hydrodynamic coupling and the switchable clutch jointly In the first case the TSD is equipped in the power branch of the switchable clutch and arranged in front of or behind the clutch. In the second case, the TSD is arranged in sequence in front of or behind both power branches. Preferably this is added to the hydrodynamic design element in the form of the hydrodynamic coupling and to the bridge coupling in a sequence. This is achieved by arranging the attenuator for oscillations between the turbine wheel and the exit. This means that the turbine wheel is coupled to the entry of the device of attenuating oscillations or via striking connection upon bridging of the hydrodynamic performance bridge the entry of the device for attenuating oscillations is connected in a rotationally fixed manner with the pump wheel via the pump wheel shell. The arrangement of the device for attenuating oscillations occurs spatially in an axial direction viewed essentially in the area or on a plane with the hydrodynamic design element. The device for attenuating oscillations within the diameter describing the portion of the hydrodynamic coupling forming the interior periphery of the toroidal work chamber is arranged in a radial direction. With this execution, the design space available in a radial direction will also be used optimally next to an especially short axial construction length.

With reference to the execution of the device for attenuating oscillations, there are no restrictions, i.e. any type of oscillation attenuator is conceivable. Devices for attenuating oscillations that are based only on striking attenuators or hydraulic attenuators, for example, are sufficient for use. The execution as a hydraulic attenuator encompasses means for the spring and/or attenuator coupling between the primary portion and the secondary portion next to a primary portion and a secondary portion which may be coupled with one another in a rotationally fixed manner for purposes of torque transfer and may be rotated in the peripheral direction against each other at a specific angle. The means for the attenuator coupling encompass chambers that may be filled with hydraulic fluid in which oscillations are transferred. The device for attenuating oscillations must be arranged only on the exit area on the turbine wheel, for which the device for attenuating oscillations in radial and axial direction is built very small and, as a rule, does not cause any enlargement of starter unit measurements given for the hydrodynamic design element.

With respect to the spatial arrangement of the pump wheel and turbine wheel connected to the entry and exit of the starter unit, there are essentially the two following possibilities:

1. Arrangement of the pump wheel in an axial direction between the entry of the starter unit and the turbine wheel of the hydrodynamic coupling;
2. Arrangement of the turbine wheel of the hydrodynamic coupling in an axial direction between the entry of the starter unit and the pump wheel.

Preferably the latter possibility will be used because, in this case, the collision possibilities of the individual elements can be optimally controlled despite a small design space.

The invention solution and its further developments are particularly suited for use in automated gears. Use in automatic transmissions is also conceivable. The starter unit can thereby be treated a separate pre-installed design element. The connection with the gears occurs through integration in the gear housing or switching behind each other with gear steps or step-free gears, for example pulling gears or toroidal gears, whereby in all cases the coupling can be realized by extending into a shaft that can be coupled with power gear steps or a step-free gear part.

Under another version of the invention, the starter unit described in the invention is suited both for use in driving belts in stationary systems and in vehicles.

The starter unit created in the invention makes possible a method for matching the starter to drive belts with different limiting conditions without requiring changes to the actual design, in particular the layout of the individual components. Only a corresponding control is required for setting the individual transfer elements—the hydrodynamic coupling or the switchable clutch. The method is characterized by the fact that the power transfer is performed alternately either via the hydrodynamic coupling, the switchable clutch or in part in a first power branch via the hydrodynamic coupling and in a second power branch via the switchable clutch jointly. The basic requirement for this possibility is only the joint or alternate separately switchability of the individual transfer elements—hydrodynamic coupling or switchable clutch. Alone with this possibility, without additional control possibilities with respect to the size of the transferable power portions, a division corresponding to the possible transferable power via the individual elements can occur. An optimization occurs via additional control and/or regulation.

According to a further development, power transferable via the first power branch may be controlled or regulated. In addition to, or independent of, this possibility, the power transferable via the switchable clutch can also be controlled or regulated. The ability to control or regulate the power transferable via the individual power branch can occur either independently of each other or coupled depending on the use of a joint or separate operating resources or control means supply system and corresponding setting apparatuses. When applying the method of the invention in a starter unit with integration of the switchable clutch built into the design of the hydrodynamic coupling, in particular an execution with a rotationally fixed coupling of a first coupling element with the pump wheel shell and a second coupling element connected to the drive with the turbine wheel or with an element connected in a rotational fixed element with this wheel when using a jointly usable pressure control system, the power portion transferable via the hydrodynamic coupling will be controlled by the absolute pressure in the toroidal working chamber and the power portion transferable via the switchable clutch will be controlled by the differential pressure between both of the guiding channels or chambers. The inlet pressure, i.e. the pressure at the input of the toroidal working chamber, or if preferred, the outlet pressure, functions as the settings for control of absolute pressure function. The setting for control of the transferable power portion via the switchable clutch is the differential pressure between the inlet and outlet, i.e. inflow and back flow.

BRIEF DESCRIPTION OF THE DRAWINGS

The invention is illustrated in the following Figures:

FIGS. 3a and 3b illustrate the basic principle of an exemplary starter unit formed according to the invention using a particularly advantageous formation;

FIG. 3c illustrates the basic principle of pressure control for realization of the power division;

FIGS. 4a and 4b illustrated the pressure control of the hydraulic components using diagrams;

DETAILED DESCRIPTION

Figure 1:
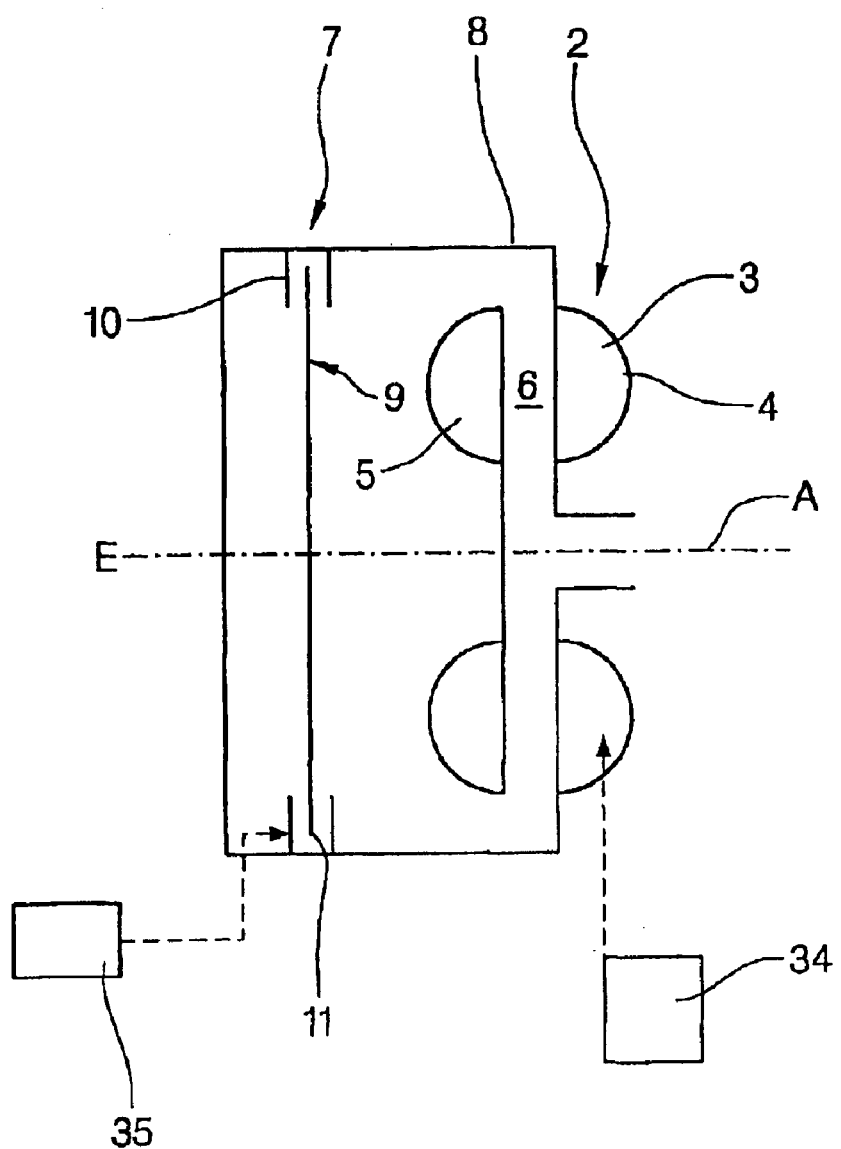
FIG. 1 illustrates in a simplified display the basic principle of the construction of a starter unit described by the invention and a method for dividing power.

FIG. 1 illustrates in a schematically simplified display the basic construction of a starter unit 1 formed according to the invention. The starter unit 1 encompasses an input E that may be coupled with a drive and an output A that may be coupled with open gear transfer steps or a drive. The starter unit 1 encompasses a starter element 2 in the form of the hydrodynamic coupling 3. The hydrodynamic coupling 3 encompasses two blade wheels, one primary wheel functioning as a pump wheel 4 and a secondary wheel functioning as a turbine wheel 5, which together form a working chamber 6 which normally has a toroidal shape. The starter unit 1 also encompasses a clutch 7 that may be switched parallel to the starter element in the form of hydrodynamic coupling 3. According to the invention, the hydrodynamic coupling 3 and the switchable clutch may be switched separately or jointly. The hydrodynamic coupling 3 and the switchable clutch are thereby arranged in two different power branches, a first power branch 8 and a second power branch 9.

The switchable clutch 7 encompasses at least two coupling elements that may be brought into an effective striking connection, preferably in the form of thrust plates, i.e. in a power flow direction viewed between the input E and the output A of the starter unit 1 viewed as a first thrust plate 10, which can also be characterized as a coupling entry disc and a second thrust plate 11 that is also characterized as a coupling exit disc. An effective connection through contact striking between the first thrust plate 10 and the second thrust plate 11 can thereby be realized directly or indirectly. In the first case, the strike pairing of the first thrust plate 10 and the second thrust plate 11 is thereby formed directly, whereas in the second case there is a switch between the elements that bear striking surfaces.

For purposes of dividing power, each transfer element—the hydrodynamic coupling 3 and the switchable clutch 7 is equipped with its own setting apparatus 35 and 35 is specified only at a black box, which achieves switchability. The switchability of the switchable clutch 7 is achieved by generating corresponding contact pressure. The switchability of the hydrodynamic coupling, for example, is achieved by filling and emptying. Control of the transferable power portions via the first and second power branch 8 and 9 occurs through control or variation of the contact pressure on the switchable clutch 7 and control and/or regulation of the filling degree of the hydrodynamic coupling 3.

Figure 2A:
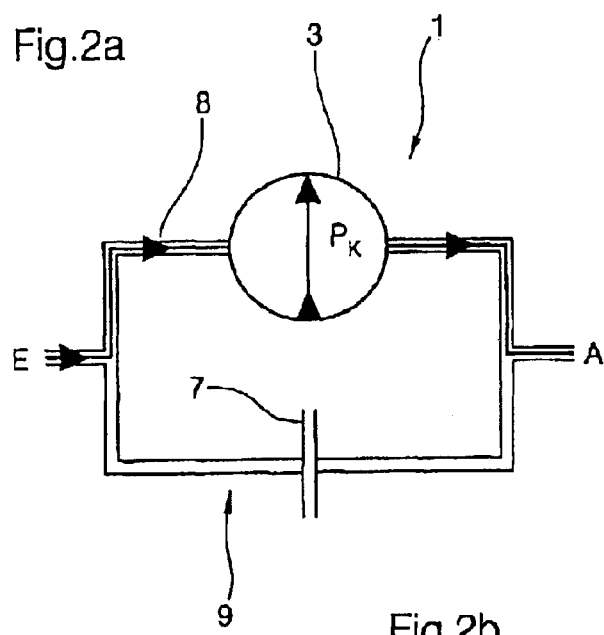
FIGS. 2a through 2c illustrate the individual basic conditions of power transfer via individual power branches.
Figure 2B:
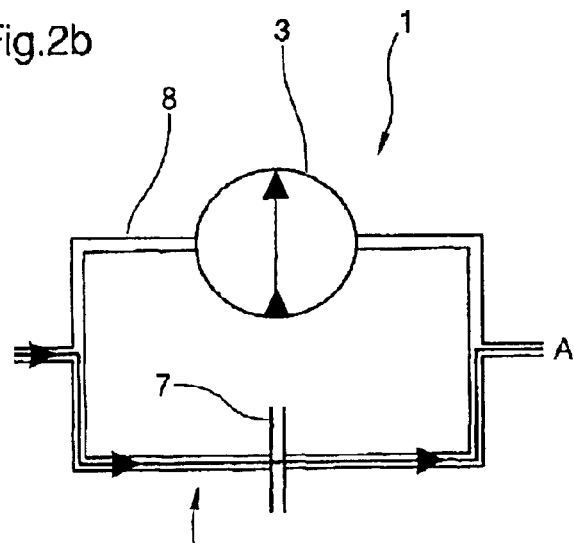
Figure 2C:
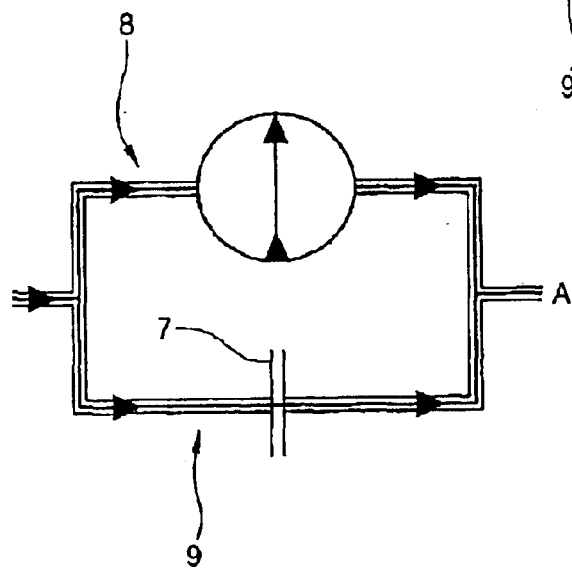

The three basic conditions are illustrated in diagrams in FIGS. 2a through 2c. These show once more the individual power branches 8 and 9, the arrangement of the individual elements to these branches and, using arrows, the power transfer in the individual basic conditions—the first basic function condition FIG. 2a, the second basic function condition FIG. 2b and the third basic function condition FIG. 2c.

In the first basic function condition, the hydrodynamic coupling 3 is switched. In this condition, the power at the input E is transmitted only via the hydrodynamic coupling 3. The switchable clutch 7 is deactivated. There is, however, the possibility of influencing the transfer relationship of the hydrodynamic coupling. This occurs by changing the filling degree. Here an increasing filling degree causes higher pressure $p_k$ in the working chamber 6 of the hydrodynamic coupling 3, as well as the reverse.

In the second basic function condition, the switchable clutch 7 is switched. In this condition, the power at the input E is only transmitted via the switchable clutch. The hydrodynamic coupling 3 is deactivated. This occurs by changing the contact pressure so that the coupling operates without slippage.

In the third basic function, both power branches 8 and 9 are activated, i.e. a first power portion is transmitted via the hydrodynamic coupling 3 and a second power portion is transferred via the switchable clutch 7. In addition, the individual power portions can be controlled independently of each other under another version of the invention. The third basic function condition can last from a short period of joint activation through activation of a main part of the starter area.

The decisive advantage of this solution, in particular the power division and free controllability of the power portions that may be transferred via the individual components, on the one hand, in an adaptation to different limiting conditions to be made only in a technical control manner, e.g. without having to make design changes. In addition, this ability to control makes it possible to freely set various starter characteristics.

As a rule, pressure functions as a setting for controlling the power portions. Both couplings can therefore be given separate pressure control, which are linked together through a general control. According to a particularly advantageous form of the invention, both systems use one pressure control system to minimize the required design space and the number of design components. According to a particularly advantageous formation in FIGS. 3a and 3b, the pump wheel 4 encompasses a pump wheel shell 12. This is formed either by a separate design element which is coupled in a rotationally fixed manner with the pump wheel 4 or is executed as an integral design unit with the pump wheel 4. The pump wheel shell 12 extends in a axial direction in the installation position, essential along the axial stretch of the turbine wheel 5 and surrounds this wheel also at least partially in the radial direction. Preferably the surrounding of the turbine wheel 5 by the pump wheel shell 6 and, in multiple part executions by their individual parts, occurs in such a way that these parts extend in a radial direction to the area of the output A. The turbine wheel is thereby connected directly or indirectly with the output A of the starter unit 1, i.e. via other transfer elements. The basic construction of the starter unit 1 otherwise corresponds to that shown in FIG. 1. The same reference numbers are therefore used for the same elements. Preferably, the first thrust plate 10 is coupled in a rotationally fixed manner to the pump wheel 4, in particular the pump wheel shell 6, whereas the second thrust plate 11 is connected in a rotationally fixed manner with the turbine wheel 5. Preferably the arrangement of the switchable clutch 7 occurs extending in a radial direction of the area of the toroidal working chamber 6.

With regard to the power transfer, the three basic operating conditions switchability can be described through switchability:

a first basic function condition, this is characterized by the sole power transfer via the hydrodynamic coupling 3, i.e., via the first power branch 8, a second basic function condition, this is characterized by the sole power transfer via the switchable clutch 7, i.e., via the second power branch 9 and a third basic function condition, this is characterized by the joint power transfer via the hydrodynamic coupling and switchable clutch 3 and 7 and thereby both power branches 8 and 9.

In the second basic function condition, the switchable clutch 7 functions as a bridge coupling. In the third basic function condition, both couplings are in operation. The power uptake of the hydrodynamic coupling 3 is controlled by the filling degree, whereas the power uptake of the switchable clutch 7 may be set by the pressure contact. Both couplings are separate, i.e. may be controlled independently of one another.

Figure 3B:
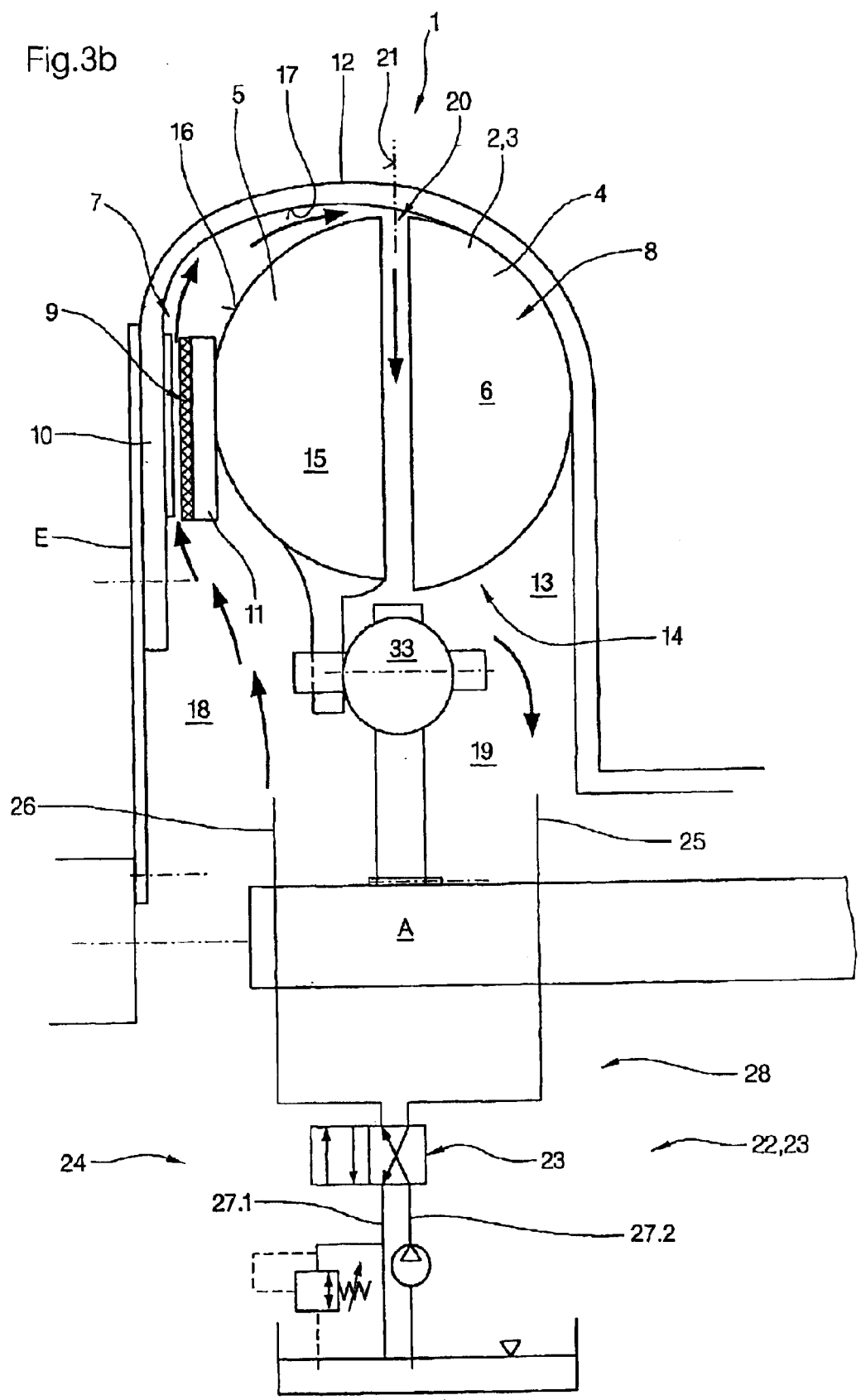

In an especially compact execution as shown in FIGS. 3a and 3b there are means 13 for generating contact pressure to realize a striking connection between both coupling elements, in particular the first thrust plate 10 and the second thrust plate 11. The means 13 preferably encompass a piston element 14 that may be struck by means of pressure, whereby the function of the piston element 14 is taken over by the turbine wheel 5 in the presented case. The turbine wheel 5 is connected for this purpose either in a rotationally fixed manner, as indicated in the figure, but executed so that it may be moved in an axial direction or the connection to the output A occurs in a direct rotationally fixed manner in the peripheral direction where it can rotate stiffly and elastically in an axial direction. An execution with axial moveability is, however, preferred.

By providing a back flow, the mentioned control may also be operated as regulators.

To achieve the function of the hydrodynamic coupling 3 and thereby the power transfer via the work cycle to be set in the toroidal working chamber 6 during operation, the movement of the operating resources occurs as shown in FIG. 3b, which displays a function condition with an operating hydrodynamic coupling 3, to the working chamber 6 around the external periphery 13 of the turbine wheel 5 and thereby between the individual elements of the switchable clutch 7, i.e. at least between the first thrust plate 10 and the second thrust plate 11. The counterforce conditioned by the movement of the operating resources flow enables an axial fixation of the turbine wheel 5 during power transfer in the hydrodynamic coupling 3. If the counterforce dissipates through diversion or change in the movement of the operating resources flow to the working chamber 6, the operating means in the toroidal working chamber 6 causes an axial force due to the building pressure in the working chamber 6, which is no longer supported by the turbine wheel 5, but leads to a movement of the turbine wheel 5 in an axial direction. This condition is presented in FIG. 3a. This movement ranges in size, for example, between 0.1 and 2 mm. This movement brings about an effective striking connection of both thrust plates, the thrust plate 10 and the second thrust plate 11 so that the turbine wheel 5 is coupled mechanically to the pump wheel 4 whereby the piston element 14 struck with contact pressure is integrated in the hydrodynamic coupling 3 and is formed from the turbine wheel 5. The part of the turbine wheel 5 carrying the second thrust plate 11 takes over the function of the piston element 14 and the operating resources in the toroidal working chamber 6 take over the function of pressure striking, with a piston element 14 functioning as a pressure hammer. Corresponding to the magnitude of pressure, contact pressure is generated via the piston element that makes possible the sole power transfer via the switchable clutch 7 and thereby the purely mechanical transfer, or the switchable clutch is operated with slippage and can only transmit a power portion, whereas the other power portion is transmitted via the hydrodynamic coupling 3.

The execution of the starter unit 1 displayed in FIGS. 3a and 3b shows an especially advantageous arrangement of the individual elements—the pump wheel 4 and the turbine wheel 5—of the hydrodynamic coupling 3. In this execution, the turbine wheel 5 is arranged spatially in an axial direction behind the pump wheel or beside it in a power transfer direction between the input E and the output A of the starter unit 1, whereas the pump wheel 4 is arranged spatially between the input E and the turbine wheel 5. Due to the integration of the means 13 for generating contact pressure to realize a striking connection of the individual elements of the switchable clutch 7 into the hydrodynamic coupling 3, the number of required design elements can be reduced to a minimum because no additional separate setups for generation or preparation of contact pressure for the individual elements, in particular the first thrust plate 10 and the second thrust plate 11 of the switchable clutch 7, are required. Another significant advantage exists due to the integrated execution in the extremely short axial design length. The length can be shortened further when using an optimized blade wheel with the inventive solution as opposed to the current state of technology.

In addition, according to the invention, the power division or power transfer in the starter unit is characterized by the movement of operating resources and the pressure in the corresponding connection lines. A design requirement for the starter unit 1 is that the pump wheel shell 12 surrounds the turbine wheel 5 in such a way that at least one guiding channel or chamber 9 is formed to move the operating resources between the external periphery 16 of the turbine wheel and the interior contour 17 of the pump wheel shell 12. Individually, this will enable the inflow of operating resources between the turbine wheel 5 and the pump wheel shell 12 in the area of the extreme radial measurement 10 of the hydrodynamic coupling 1, especially the primary wheel 4 and the turbine wheel 5 in the area of a separation plane 21 between the pump wheel 4 and the turbine wheel 5 from above in the direction of the work cycle being set in the toroidal working chamber 6 and achieving a centripetal flow. Furthermore, at least one guiding channel or chamber 19 is added to the hydrodynamic coupling, which enables movement of the operating resources to the toroidal working chamber 6 in a centrifugal direction. For the guiding channel or chamber 19, this may be a line or special channel formed and incorporated in the connection design. The term 'channel' is to be viewed with respect to the function and can also include internal spaces or combined channel and chamber sections. The guiding channel or chamber 18 in particular is a circular operating resources space. Furthermore, each of the guiding channels 18 or 19 is formed in such a way that they can also serve to draw away, in addition to adding, operating resources to the toroidal working chamber 6, i.e. is thereby a connection with at least one entry and or exit from the toroidal working chamber 6. It is therefore insignificant in which areas the operating resources exit from the toroidal working chamber 6. According to the invention, both guiding channels or chambers 18 and 19 may be used alternatively to draw in or expel operating resources so that the flow direction also changes. To do so, there will be means for alternate change in the flow direction of the hydrodynamic coupling 1. These means can also be characterized as flow direction change means 22. In the simplest case, these means encompass a valve apparatus, which reverses the function of the described operating resources channel or operating resources movement chamber with respect to the function of drawing in or expelling operating resources. The valve apparatus is thereby, in the simplest case, executed as a directional valve apparatus 23. This can be a component of the starter unit 1; there is, however, the possibility of connecting the guiding channels or chambers to an operating resources supply system 24, which is spatially arranged essentially outside of the starter unit 1. In this case the valve apparatus 23 can also be arranged in a gear or at a random point outside of the starter unit 1.

The second valve placement II of the valve apparatus 23 presented in FIG. 3a is characterized by the fact that there is centrifugal flow through the hydrodynamic coupling 3. In this case, operating resources are moved in the area of the interior periphery of the toroidal working chamber 6 via the guiding channel or chamber 19. In the first switch setting of the directional valve 23 displayed in FIG. 3b, the movement of the operating resources occurs via the guiding channel or chamber 18 at the exterior periphery 16 of the turbine wheel 5 and from there into the area of the separation plane 21 in the area of the extreme redial distance 20 of the hydro dynamic coupling 3, into the toroidal working chamber 6. There will be centripetal flow through the hydrodynamic coupling upon cycle build-up. To achieve a safer manner of functioning and to be able to employ possibilities of pressure control, both guiding channels or chambers are insulated from each other, i.e. pressure insulated and impermeable.

The operating resources supply system 24 is presented in the figures independent of the actual integration of specific parts in the starter unit 1 equipped to it. The individual connection lines 25 and 26 are connected with one another via corresponding connection lines 27.1 and 27.2 with a container 36 as an operating resources source and a storage apparatus to an open system 28. The connection line 27.1 functions in FIG. 3a as a return line, whereas 27.2 functions as a feed line. A controllable pressure limitation valve 29 is added to the return line 27.1 for pressure control. For supplying the operating resources, a conveyor pump 38 is arranged. This makes it possible for the power transfer to occur at the same time via the switchable clutch 7 and the hydrodynamic coupling 3. The power transfer for the switchable clutch 7 will be controlled directly via the differential pressure between both connections 25 and 26 and thereby also indirectly via the hydrodynamic branch 8, i.e. the hydrodynamic coupling 3. Using absolute pressure, the power transfer can be changed via the hydrodynamic coupling 3. FIG. 3a shows the valve apparatus 23 in the second switch position. This is characterized by the fact that there is centrifugal flow. According to the magnitude of the contact pressure, the switchable clutch 7 is used for power transfer alone or jointly—then operated with slippage—with the hydrodynamic coupling 3. The first switch position I as shown in FIG. 3b is characterized by the fact that there is centripetal flow and sole power transfer via the hydrodynamic coupling.

The diagram in FIG. 3c provides an explanation of the control of power transfer in detail for the parallel arrangement of the components—the hydrodynamic coupling and the switchable clutch. The diagram shows the pump wheel 4, the turbine wheel 5, the pump wheel shell 12 coupled with the pump wheel 4 in a rotationally fixed manner, the piston 14, which is coupled in a rotationally fixed manner with the turbine wheel 5, as well as the switchable clutch 7 with a first thrust plate 10 and a second thrust plate 11, which is coupled with the piston element 14. The pressure $p_1$ is the pressure in the first guiding channel or chamber 18; pressure $p_2$ is the pressure in the second guiding channel or chamber 19. The pressure in the hydrodynamic coupling 3 is designated $p_k$.

Pressure control of the hydrodynamic coupling 3 is characterized by the change of pressure $p_2$. By changing $p_2$ the transfer relationship of the coupling 3 can be influenced across large ranges upon constant rpm's of the pump wheel and turbine wheel.

The pressure $p_2$ is proportionate to the cycle pressure $p_k$. This is dependent on the filling degree. An increasing filling degree means a greater portion of the operating medium in the circulation of operating resources, whereby the transfer capacity increases. The filling degree in the hydrodynamic cycle is influenced by the pressure $p_2$ and the differential pressure $(p_2-p_k)$ and this in turn influences the cycle pressure $p_k$.

Figure 4A:
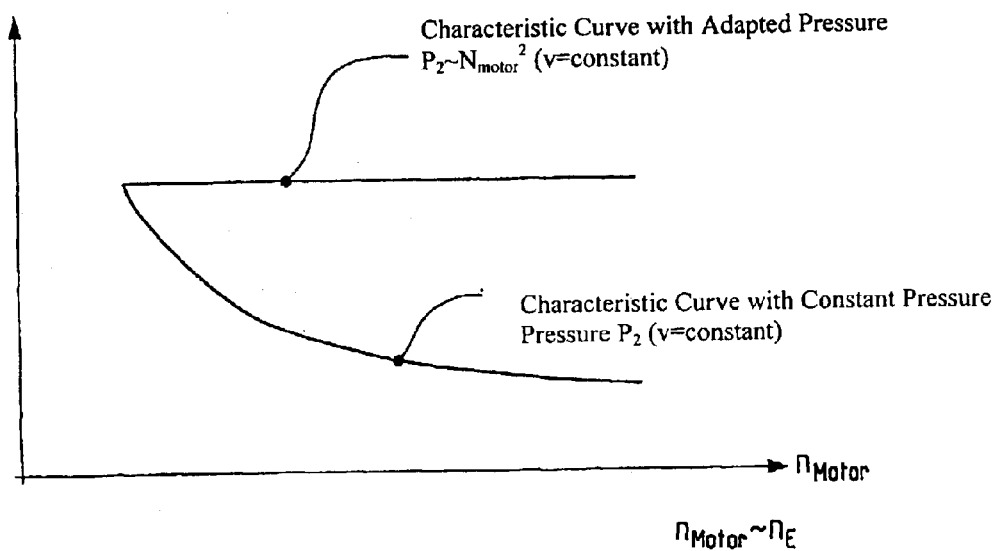

Another influence magnitude for the cycle pressure $p_k$ is the primary wheel rpm and the rpm of the drive engine. The cycle pressure $p_k$ increases by the square of the motor or drive rpm. Because $p_k$ is proportionate to $p_2$ in a stationary condition, the cycle pressure $p_k$ adapts to the pressure $p_2$ via the filling degree, i.e. the hydrodynamic cycle in the working chamber 6 goes stronger in a partial filling at constant pressure $p_2$ and the transfer capacity, expressed by the power figure, falls. At increasing pressure and constant rpm the transfer capacity also increases. By adapting the magnitude of the pressure $p_2$ with the square of the more or drive rpm n, this relationship can be changed, as illustrated in FIG. 4a. If the pressure $p_2$ and the drive rpm are constant, the hydrodynamic coupling 3 transfers momentum at a variable drive rpm corresponding to the characteristic curve of constant pressure, as displayed in FIG. 4b. By changing the pressure, the transferable momentum increases or decreases to other characteristic curve of constant pressure, e.g. $p_{konstant-1}$ to $p_{konstant-2}$.

The pressure control of the switchable clutch occurs through mutual pressure striking of the piston 14 that may be moved in an axial direction. The resulting axial force is derived from the pressure difference $(p_1-p_2)$ and the surface relationship of the piston 14. The setting for control of the transferable power via the switchable clutch is therefore the pressure difference between the connection and guiding channels or chambers 19 and 18.

From the combination of both possibilities for pressure control of the individual components, there is the possibility of controlling the power division to both components. Here $p_2$ functions as a setting for the pressure control of the hydrodynamic coupling 3 and the pressure difference ($p_2-p_1$) as a setting for control of the power uptake of the switchable clutch 7.

Figure 5:
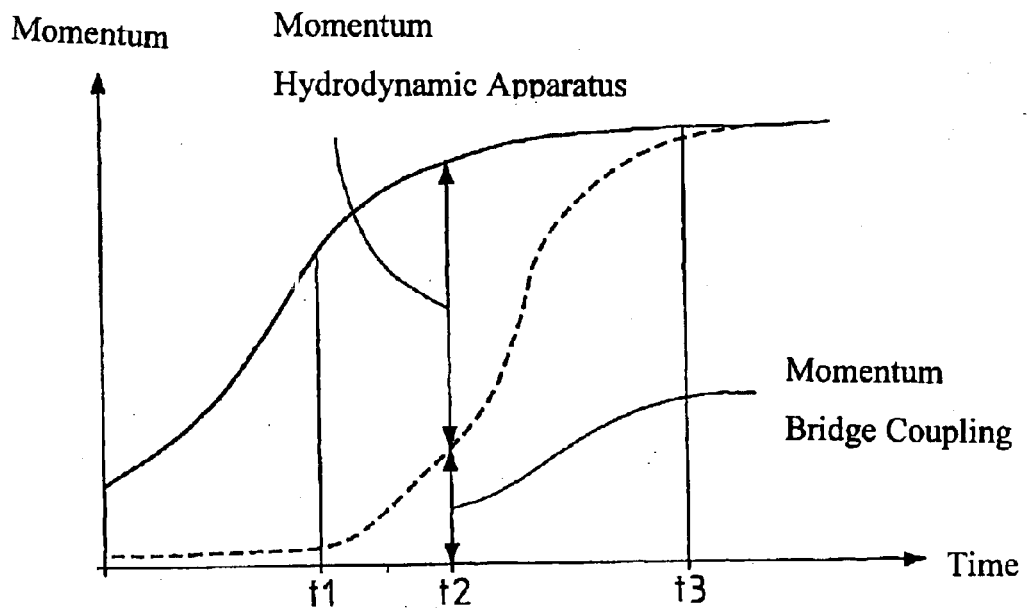
FIGS. 5 and 6 illustrate the time passage of the power division during a start procedure using diagrams.

FIG. 5 uses a diagram to illustrate the time passage of a possible momentum division during operation of the starter unit. In the starter area the power that is transferable via the hydrodynamic coupling and the momentum amounts almost 100% of the drive momentum, in this case approximately t1. With an increasing drive rpm, i.e. when coupling the starter unit with output gear steps of the gear rpm, the switchable clutch 7 can then be switched via increasing the pressure difference ($p_2-p_1$) until this amounts to the entire momentum at 13 in the synchronous run of the drive rpm, i.e. rpm at the input of the starter unit and the output of the starter unit. By changing the pressure $p_2$, the transferred momentum of the hydrodynamic coupling can also be adapted to the requirements of the respective operating condition. The time t2 characterizes a time with a common power transfer.

Figure 6:
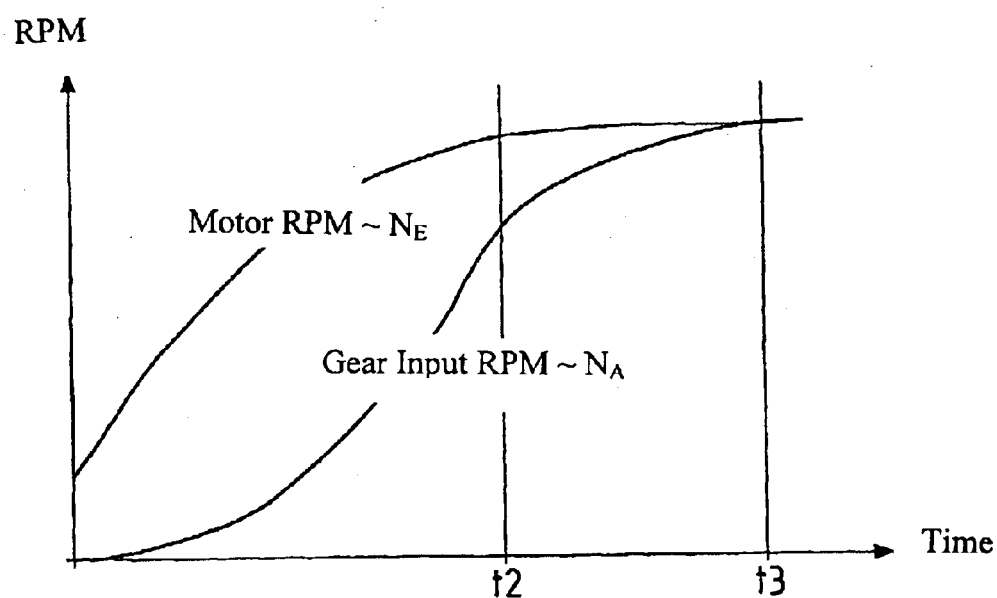

FIG. 6 illustrates the characteristic curve that characterizes this process in the rpm-time diagram.

Figure 7:
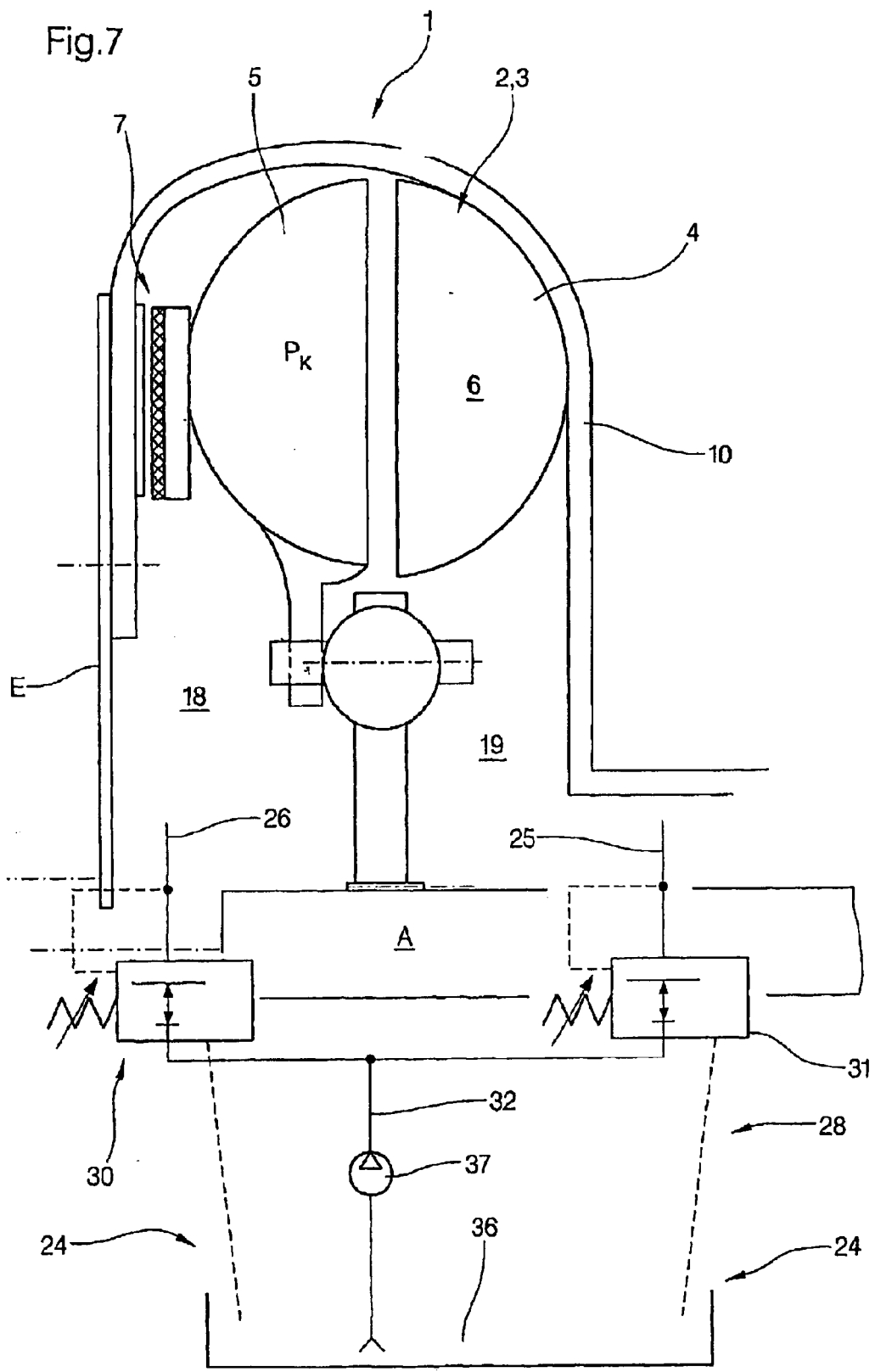
FIG. 7 illustrates an advantageous formation of a starter unit in accordance with the invention.

In contrast, FIG. 7 illustrates an especially advantageous further development of the execution presented in FIG. 3a. Here the coupling of both guiding channels or chambers 18 and 19 to the operating resources supply 24 occurs via an open system 28 with a connection line 32 to the operating resources source 36. In this case each guiding channel or chamber 18 and 19 and the connection to these are equipped with a separate controllable valve apparatus. This valve apparatus may be, for example, a pressure regulation valve 30 and 31, whereby both the flow direction and the transferable power portion of the hydrodynamic coupling and the switchable clutch can be determined by setting the pressure value in the guiding channels or chambers 18 and 19. In addition, the transferable power portions axe controllable individually or jointly via any coupling—hydrodynamic coupling 3 and switchable clutch 7. A first power portion will be transferred during parallel operation of the hydrodynamic coupling 3 and the switchable clutch 7 via an initial power branch, in which the hydrodynamic coupling 3 is arranged. A second power portion is transferred via a second power branch in which the switchable clutch 7 is arranged. Controlling of the first power portion occurs via control of the absolute pressure in the hydrodynamic coupling 3. The pressure being exerted on the guiding channel or chamber 19 functions as a control variable for this process. Control of the second power portion is realized via the differential pressure placed upon the connections 25 and 26.

In another aspect of the invention, the starter unit 1 shown in FIG. 3a encompasses a device for attenuating oscillations 33, in particular a torsion oscillation attenuator. This can be executed in many forms. In the simplest case, this is executed as a simple strike attenuator setup. Executions with hydraulic attenuation are, however, conceivable. With respect to the concrete formation of that type of device for attenuating oscillations 33, reference can be made to executions known from the current state of technology. Concrete selection is left to the judgment of the responsible technician. According to an advantageous formation, the hydrodynamic design element, hydrodynamic coupling 3, the switchable clutch and the device 33 for attenuating oscillations are switched in sequence. The device for attenuating oscillations 33 encompasses a primary part, which is connected in a rotationally fixed manner to the turbine wheel 3 and thereby the second thrust plate 11 and a secondary part, which is coupled with the output A in a rotationally fixed manner. Means for attenuating and/or spring coupling are planned between the primary part and the secondary part. The device for attenuating oscillations 33 is arranged according to the power transfer branch upon power transfer via the hydrodynamic coupling 3 between the hydrodynamic coupling 3, in particular the turbine wheel 5 and the output A, as well as upon power transfer via the switchable clutch 7 between the switchable clutch 7, in particular to the output formed by the second thrust plate 11 and the output A of the starter unit 1. In both cases the device 33 for attenuating oscillations is switched in sequence to the respective power transferring element—the hydrodynamic coupling 3 or switchable clutch 7. Also, when the hydrodynamic coupling 3 and switchable clutch 7 are operated simultaneously, i.e. power transfer via two power branches—transfer of a first power portion of the total power via the hydrodynamic coupling and transfer of the second power portion via the switchable clutch 7—the torsion oscillation attenuator is switched to both of the power branches in a sequence.

Figure 8:
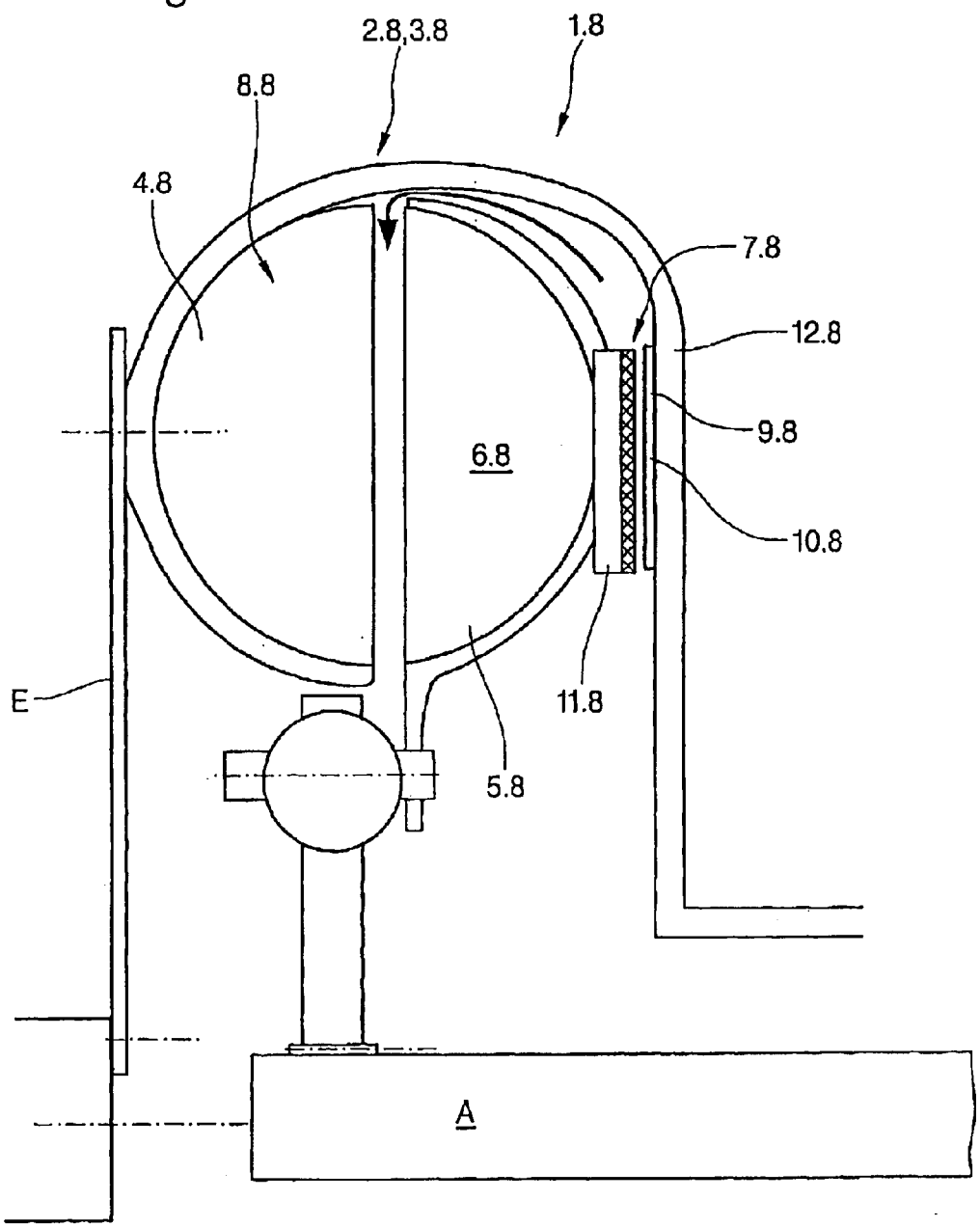
FIG. 8 illustrates an advantageous execution of a starter unit with the blade wheels reversed from their configuration in FIGS. 1a and 1b.

FIG. 8 illustrates in a simplified diagram a further formation of a starter unit 1.8 formed according to the invention with a starter element 2.8 in the form of a hydrodynamic coupling 3.8. The hydrodynamic coupling 3.8 here also encompasses a primary wheel 4.8 and a secondary wheel 5.8 which together form a toroidal working chamber 6.8. In addition, there is also a switchable clutch 7.8. which may be switched parallel to the hydrodynamic coupling. The basic function corresponds to the function described in FIGS. 1 through 7. The same reference numbers are also used for the same elements. In contract to the execution described in FIG. 1a, however, the pump wheel 4.8 is, viewed spatially in an axial direction, arranged between the entry E and the turbine wheel 5.8, i.e. the turbine wheel is not arranged on the motor drive side but on the motor side, opposite the executions in the preceding figures. The coupling between a drive, particularly the input E of the starter unit 1.8 and the pump wheel 4.8 occurs by surrounding the secondary wheel 5.8 in an axial direction.

REFERENCE NUMBER LIST 1, 1.8 Starter Unit
2, 2.8 Starter Element
3, 3.8 Hydrodynamic Coupling
4, 4.8 Pump Wheel
5, 5.8 Turbine Wheel
6, 6.8 Working Chamber
7, 7.8 Switchable Clutch
8, 8.8 First Power Branch
9, 9.8 Second Power Branch
10, 10.8 First Coupling Element
11, 11.8 Second Coupling Element
12, 12.8 Pump Wheel Shell
13 Means for Generating Contact Pressure
14 Piston Element
15 Pressure Chamber
16 External Periphery of the Turbine Wheel
17 Internal Periphery of the Pump Wheel Shell
18 First Guiding Channel or Chamber
19 Second Guiding Channel or Chamber
20 Extreme Radial Measurement
21 Separation Plane 22 Means for Change in Flow Direction
23 Directional Valve Apparatus
24 Operating Resources Supply System
25 Connection
26 Connection
27.1, 27.2 Connecting Lines
28 Open System
29.1 Pressure Limitation Valve
30 Pressure Regulation Valve
31 Pressure Regulation Valve
32 Connecting Line
33 Device for Attenuation of Oscillations
34 Setting Apparatus
35 Setting Apparatus
36 Container
37 Conveyor Pump

What is claimed is:

1. A starter unit, comprising:
an input that can be coupled with a drive and an output that can be coupled with the drive;
a starter element in the form of a hydrodynamic coupling;
a switchable clutch encompassing a first coupling element and a second coupling element that can be brought together in a striking connection with each other either directly or indirectly via transfer means, said first coupling element and said second coupling element respectively coupled in a rotationally fixed manner to the input and the output;
the hydrodynamic coupling and the switchable clutch being arranged in parallel in two power branches and able to be switched jointly or individually, the hydrodynamic coupling being controlled or regulated;
an operating resources system supplied to the hydrodynamic coupling, the operating resources system comprising an operating resources supply source, a first connection for coupling with a first guiding channel or chamber and a second connection for coupling with a second guiding channel or chamber, the operating resources system including an open circuit connected to said supply channels or chambers by way of said connections;
means for operational change in flow direction of the hydrodynamic coupling through allocation of inflow or outflow functions to both supply channels or chambers; and
means to control the absolute pressure in the working chamber of the hydrodynamic coupling and the differential pressure between the first connection and the second connection.

2. The starter unit of claim 1 including means for generating contact pressure to cause at least an indirect connection between a first coupling element and a second coupling element.

3. The starter unit of claim 1, wherein:
the hydrodynamic coupling comprises a pump wheel and a turbine wheel that together form a toroidal working chamber;
the starter includes a pump wheel shell coupled in a rotationally fixed manner with the pump wheel and surrounding the turbine wheel in an axial direction via formation of the first guiding channel or chamber;
the second guiding channel or chamber leads into an area of the internal diameter of the toroidal working chamber or below it;
the first and second guiding channels or chambers may alternatively be used as an inflow or outflow channel or chamber to or from the toroidal working chamber.

4. The starter unit of claim 3, wherein;
the first coupling element is connected in a rotationally fixed manner with the pump wheel shell and the second coupling element is connected in a rotationally fixed manner with the turbine wheel;
the means for generating contact pressure for realizing at least an indirect striking connection between the first and second coupling elements includes at least one piston element that may be struck by pressure means.

5. The starter unit of claim 4, wherein:
the turbine wheel is connected in a rotationally fixed manner with the output of the starter unit but is movable in an axial direction;
the piston element is formed by the turbine wheel;
a chamber that may be filled with pressure means for striking the piston element is formed by the toroidal working chamber.

6. The starter unit of claim 4, including means for generating a counteracting force to the piston element which causes slippage or deactivation of the switchable clutch during operation of the hydrodynamic coupling.

7. The starter unit of claim 6 wherein the means for generating a counteracting force comprises means for moving operating resources via the first guiding channel or chamber between the individual coupling elements.

8. The starter unit of claim 2 wherein the means for generating contact pressure to cause at least an indirect connection between the coupling elements and the means for generating the counteracting force encompass means for changing the flow direction of the hydrodynamic coupling.

9. The starter unit of claim 3, wherein:
the first coupling element and/or the second coupling element is executed as one part with the pump wheel shell and/or with the turbine wheel;
the pump wheel shell and/or the turbine wheel are coated with a striking layer.

10. The starter unit of claim 3, wherein:
the first coupling element and/or the second coupling element is executed as a separate element, which is connected in a rotationally fixed manner with the pump wheel shell and/or the turbine wheel;
the striking surf aces are formed from the separate elements or a striking layer placed on the elements.

11. The starter unit of claim 3 wherein the second coupling element is arranged on the back side of the turbine wheel.

12. The starter unit of claim 11 wherein the second coupling element is arranged in a radial direction in an area between the external diameter and the internal diameter of the toroidal working chamber.

13. The starter unit of claim 3 wherein the first coupling element and the second coupling element are aligned parallel to the separation plane between the pump wheel and the turbine wheel.

14. The starter unit of claim 3 wherein the turbine wheel is spatially arranged between the input and the pump wheel.

15. The starter unit of claim 3 wherein the turbine wheel is arranged spatially behind the pump wheel in a direction of power flow and the pump wheel is between the input and the turbine wheel.

16. The starter unit of claim 3, wherein:
the means for optional change in flow direction comprises a valve apparatus having a first switch setting characterized by the coupling between inflow and the first guiding channel or chamber and outflow and the second guiding channel or chamber, and a second switch setting characterized by the coupling between the inflow and the second guiding channel or chamber and outflow and the first guiding channel or chamber, the means for controlling the absolute and differential pressure comprising at least one pressure regulation or limitation valve apparatus connected to at least one connection corresponding to the function of inflow or outflow.

17. The starter unit of claim 1, wherein the means for optionally changing the flow direction of the hydrodynamic coupling and the means for control of the absolute and differential pressure encompass a pressure regulation valve apparatus that is connected to the individual guiding channels or chambers and which can be controlled separately.

18. The starter unit of claim 1 including a device for attenuation of oscillations, said device being either switched in sequence in front of or behind the power branches or switched and sequenced in front of or behind a second of the power branches of the switchable clutch.

19. A process for matching a starter unit as described in claim 1 drive belts with different limitation conditions, comprising:

transferring power selectively:
   via the hydrodynamic coupling, or
   via the switchable clutch, or
   partially in the first power branch via the hydrodynamic coupling and the second power branch via the switchable clutch;

controlling or regulating the power transfer via the hydrodynamic coupling; and controlling or regulating the power transfer via the switchable clutch.

20. The method of claim 19 wherein the power transferable via the hydrodynamic coupling is controlled independently of the power transferable via the switchable clutch.

21. The method of claim 19 wherein the power portion transferable via the hydrodynamic coupling is controlled by controlling the absolute pressure in the toroidal chamber, and the power portion transferable via the switchable clutch is controlled by controlling the differential pressure between both of the guiding channels or chambers.

* * * * *

UNITED STATES PATENT AND TRADEMARK OFFICE
CERTIFICATE OF CORRECTION

PATENT NO. : 6,899,209 B2
DATED : May 31, 2005
INVENTOR(S) : Heinz Holler et al.

It is certified that error appears in the above-identified patent and that said Letters Patent is hereby corrected as shown below:

Column 18,
Line 44, delete "sur faces" and insert -- surfaces --.

Column 19,
Line 22, after "claim 1" insert -- to --.

Signed and Sealed this

Sixth Day of September, 2005

JON W. DUDAS
*Director of the United States Patent and Trademark Office*